(No Model.) 6 Sheets—Sheet 1.

J. B. G. A. CANET.
HYDRAULIC BRAKE FOR ORDNANCE.

No. 456,016. Patented July 14, 1891.

Witnesses. Inventor.
Jean B. G. A. Canet,
By James L. Norris
Atty.

(No Model.) 6 Sheets—Sheet 2.

J. B. G. A. CANET.
HYDRAULIC BRAKE FOR ORDNANCE.

No. 456,016. Patented July 14, 1891.

Witnesses.
J. A. Rutherford
Robert Lovett

Inventor,
Jean B. G. A. Canet.
By James L. Norris
Atty.

(No Model.)  6 Sheets—Sheet 3.

J. B. G. A. CANET.
HYDRAULIC BRAKE FOR ORDNANCE.

No. 456,016.  Patented July 14, 1891.

Witnesses.

Inventor.
Jean B. G. A. Canet.
By James L. Norris
Atty.

(No Model.)

J. B. G. A. CANET.
HYDRAULIC BRAKE FOR ORDNANCE.

No. 456,016. Patented July 14, 1891.

Witnesses.
J. A. Rutherford.
Robert Everett.

Inventor:
Jean B. G. A. Canet,
By James L. Norris
Atty.

(No Model.) 6 Sheets—Sheet 6.

J. B. G. A. CANET.
HYDRAULIC BRAKE FOR ORDNANCE.

No. 456,016. Patented July 14, 1891.

UNITED STATES PATENT OFFICE.

JEAN BAPTISTE GUSTAVE ADOLPHE CANET, OF PARIS, FRANCE, ASSIGNOR OF ONE-HALF TO THE SIR JOSEPH WHITWORTH & COMPANY, LIMITED, OF OPENSHAW, ENGLAND.

HYDRAULIC BRAKE FOR ORDNANCE.

SPECIFICATION forming part of Letters Patent No. 456,016, dated July 14, 1891.

Application filed February 27, 1889. Serial No. 301,378. (No model.) Patented in England January 2, 1884, No. 279, December 24, 1884, No. 3,452, and June 27, 1887, No. 9,125; in France January 29, 1884, No. 160,004, and in Spain April 2, 1886, No. 5,817.

*To all whom it may concern:*

Be it known that I, JEAN BAPTISTE GUSTAVE ADOLPHE CANET, civil engineer, a citizen of the Republic of France, and a resident of Paris, France, have invented new and useful Improvements in Hydraulic Brakes for Ordnance, (for which I have obtained patents in Great Britain, No. 279, dated January 2, 1884; No. 3,452, dated December 20, 1884, and No. 9,125, dated June 27, 1887; in France, No. 160,004, dated January 29, 1884, and certificate of addition dated February 27, 1886, and in Spain, No. 5,817, dated April 2, 1886,) of which the following is a specification, reference being had to the accompanying drawings.

My invention relates to apparatus for checking or controlling the recoil of a gun and its return to the firing position.

In order that a gun may return to its firing position immediately after its recoil, the surface of the chassis, slide, or frame upon which it moves is generally formed with sufficient inclination to allow the gun to run out at a moderate speed under the action of gravity. In the mounting of guns for use on board of a ship or vessel allowance must be made for the rolling motion of the vessel, and for this reason gun-mountings for naval service have usually been made with a chassis or slide having a greater angle or inclination than those of gun-mountings for land service, or the chassis or slide has been provided with rollers on which the gun is supported and arranged to move in its recoil and running-out movements, and which, by reducing the friction, facilitate the return of the gun to the firing position. The result is that under certain circumstances—when, for example, the period of rolling coincides with the downward movement of the gun upon its slide, so that during such downward movement the angle or inclination of the said slide is increased—the gun returns to the firing position with too great a velocity, and the mounting is therefore liable to injury by shock or concussion. The speed with which the gun returns to the firing position has in some instances been controlled by means of brakes worked by manual power.

Now my invention is chiefly designed to provide for the automatic control of the running out or return movement of the gun, and thus obviate or greatly diminish the liability to dangerous shocks arising from the return of the gun to the firing position with too great a velocity. For this purpose I combine with hydraulic brakes for controlling the recoil of a gun, devices which are so arranged that they will not obstruct or interfere with the action of the brake during the recoil, but will automatically control the running out or return of the gun to the firing position, so that such return can be caused to take place at a moderate speed.

My said invention, moreover, comprises the combination, with a recoil-brake, of a hydraulic cushion or buffer for arresting the movement of the gun without severe shock or concussion at the termination of its return movement; and my said invention further comprises other improvements in brakes for controlling the recoil and return movements of a gun.

In the accompanying drawings I have shown how my said invention may be conveniently and advantageously carried into practice.

Like letters indicate corresponding parts throughout the drawings.

A is the hydraulic cylinder, B the piston, and C the piston-rod of the brake.

In the arrangement shown in Figs. 1 to 11 the cylinder is intended to be movable with the gun and top carriage, while the piston-rod is firmly secured to the chassis or other stationary part of the gun-mounting.

Figure 1:
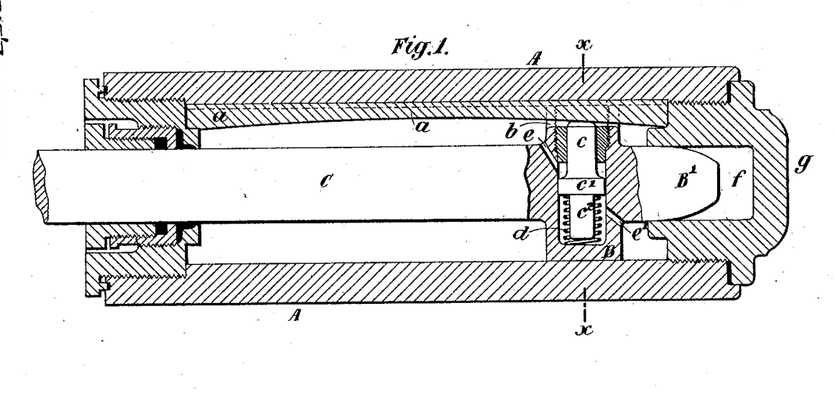
Figure 1 is a longitudinal central section of a hydraulic brake with my improvements applied thereto.
Figure 2:
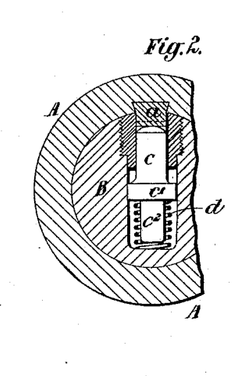
Fig. 2 is a transverse section on the line *x x*, Fig. 1.

Referring to Figs. 1 and 2, $a$ is a curved or taper rod or bar, which is fixed in a longitudinal groove in the interior of the cylinder A and projects into the bore of the said cylinder. This rod or bar is so curved or tapered as to be thinner or shallower at the middle than at either end thereof. The piston B is formed with a slot $b$, in which works the bar $a$, an opening being left between the said bar $a$ and the bottom of the slot $b$ to permit the passage of liquid from one to the other side of the said piston. The transverse sectional area of this opening will, by reason of the curved or taper formation of the bar $a$, vary with the position of the cylinder A relatively to the fixed piston B in the well-known manner.

A valve $c$ is arranged in a cylindrical chamber or cavity in the piston B and projects into the slot $b$ thereof. This valve is formed with a piston $c'$, fitting the said chamber or cavity, and with a rod or stem $c^2$, on which is placed a spring $d$. This spring tends to press the valve $c$ against the bar $a$. The said chamber or cavity in the piston B communicates with the space in the cylinder A on either side of the said piston B by means of orifices $e\ e'$, which are situated on opposite sides of the piston $c'$. The diameter of the valve $c$ is equal to the width of the bar $a$ and slot $b$, and the said valve is rounded at its outer extremity, so that there will be a small orifice or orifices between the valve and the bar $a$ for the passage of the liquid, even when the said valve is pressed against the said bar. These orifices, which can be made of any required size, permit the flow of liquid from one to the other side of the piston during the running out or return of the gun to its firing position.

The piston B is provided with a conoidal or taper extension B′, the axis of which is in line with that of the piston-rod C, and which is adapted to enter a chamber or cavity $f$ in the plug $g$, which forms one end or cover of the brake-cylinder A. This extension is made of such length that it will enter the said cavity $f$ a short time before the termination of the running out or return movement of the gun, and the said extension is so formed that the space for the passage of the liquid between the said extension and the wall of the said cavity will be gradually closed in such return movement of the gun. I thus provide a hydraulic buffer or cushion for gradually arresting the running out or return movement of the gun, and thereby preventing excessive shock or concussion at the termination of such movement.

The operation of the improved brake (shown in Figs. 1 and 2) is as follows, viz: When the gun is fired, the hydraulic cylinder A, being formed on or firmly attached to the cradle or top carriage in which the gun is supported, recoils therewith, the piston B remaining stationary. The liquid in the said cylinder in front of the piston is therefore subjected to pressure. This pressure, acting upon the piston $c'$ through the opening $e$, forces down the said piston $c'$ and the valve $c$, thereby increasing the transverse sectional area of the orifice for the flow of liquid between the bar $a$ and the bottom of the slot $b$. The transverse sectional area of this orifice is, moreover, increased during the recoil, by reason of the curved or taper formation of the bar $a$, until the shallowest part of the said bar $a$ arrives opposite the piston B, and is then gradually decreased until the termination of the recoil. In the running out or return movement of the gun the liquid in the cylinder in rear of the piston B is subjected to pressure, and the piston $c'$ and valve $c$ being moved back by the spring $d$, aided, it may be, by the pressure of the liquid acting upon the said piston $c'$ through the opening $e'$, the orifice between the bar $a$ and the bottom of the slot $b$ is nearly closed. Therefore the running out or return movement of the gun must take place slowly, the speed of the gun in such return movement being proportionate to the speed of flow of the liquid through the said orifice. As soon as the extension B′ of the piston B enters the chamber or cavity $f$ in the plug or cover $g$, the liquid inclosed in the said chamber or cavity can only escape through the annular space between the wall of the said chamber or cavity and the said extension B′, which space is, by reason of the shape or configuration of the said extension, gradually diminished. Therefore the liquid in the said chamber or cavity is subjected to increasing pressure, whereby the movement of the gun and top carriage is arrested without injurious shock or concussion.

If desired, the valve $c$, instead of being rounded at its extremity, as above described, may have a groove formed therein for the passage of liquid from one to the other side of the piston B during the running out or return movement of the gun.

Figure 3:
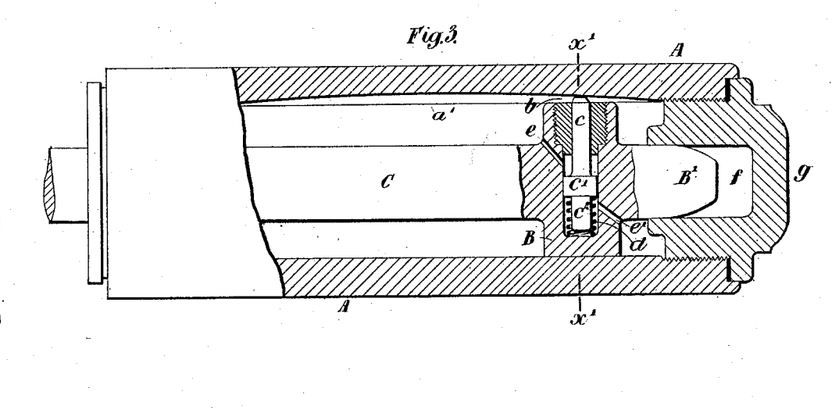
Fig. 3 is a side elevation, partly in longitudinal central section.
Figure 4:
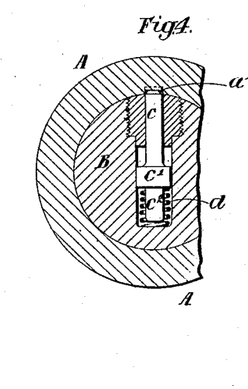
Fig. 4, a transverse section on the line *x' x'*, Fig. 3, illustrating another form or modification of my invention.

Figs. 3 and 4 illustrate a modification of my invention in which, in place of the bar $a$, the cylinder A is provided with a longitudinal groove $a'$, which is deeper in the center than at the ends thereof. Moreover, the piston B is made without the slot above described, and the valve $c$ is pressed by its spring $d$ against the bottom of the groove $a'$. The operation of this brake is substantially similar to that of the brake above described, the liquid in the recoil flowing through the groove $a'$ instead of through the slot in the piston.

Figures 5, 7:
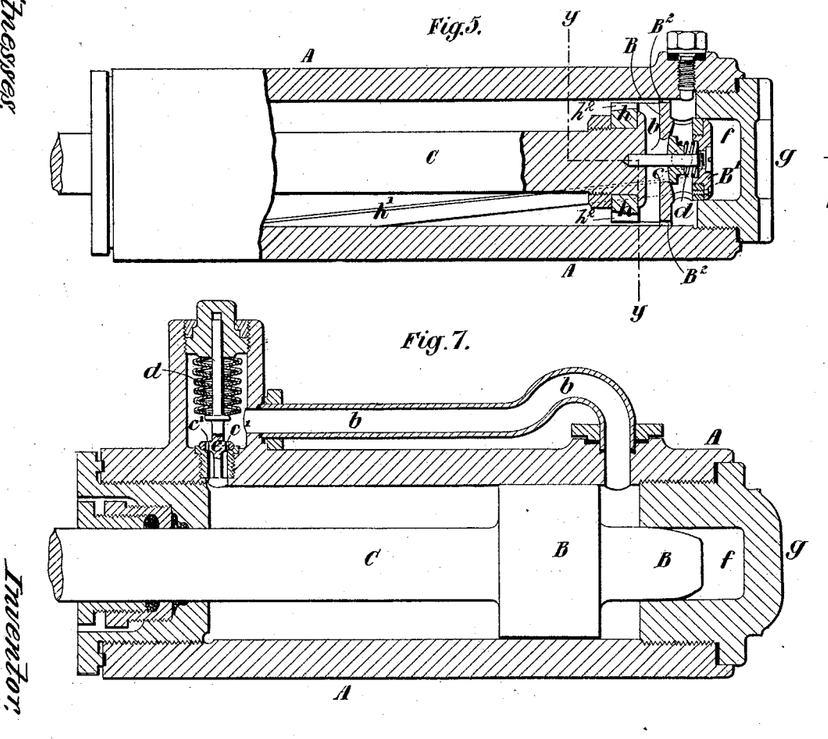
Fig. 5 is a side elevation, partly in longitudinal central section.
Fig. 7 is a longitudinal central section illustrating another modification thereof.
Figure 6:
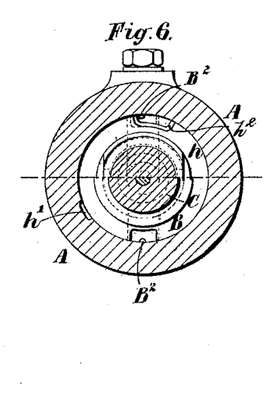
Fig. 6, a transverse section on the line *y y*, Fig. 5, showing another modification of my said invention.

The arrangement shown in Figs. 5 and 6 is adapted for hydraulic brakes with variable orifices, such as the "Vavasseur" brake. In this brake the piston B is formed with orifices for the flow of liquid through the same, and is provided with a disk or valve $h$, which has corresponding orifices $h^2$, and to which, in the longitudinal movement of the cylinder on the piston, rotary motion is imparted by means of one or more helicoidal grooves $h'$ in the cylinder A, thereby gradually moving the apertures $h^2$ out of coincidence with the corresponding apertures in the piston, and thus varying the transverse sectional area of the passage for the flow of liquid through the piston in the recoil and return movements of the gun.

To moderate the speed of the gun and top carriage when running out or returning to the firing position, I arrange the aforesaid orifices so that they open into a cavity or passage $b$ in the piston B, and I provide a valve $c$, acted upon by a spring $d$, which tends to press the said valve against a seat in the piston, and thus prevent the flow of the liquid through the passage $b$, except when the valve is moved away from its seat, as hereinafter described. Small grooves or orifices $B^2$ are, moreover, formed in the piston B for the purpose hereinafter specified.

Figure 16:
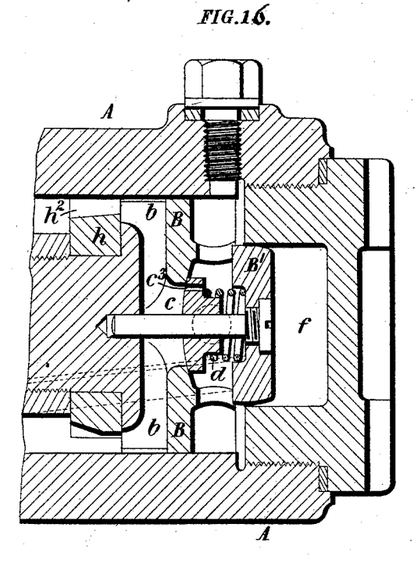
Figs. 16, 17, 18, and 19 are longitudinal central sections showing still further modifications thereof.
Figure 17:
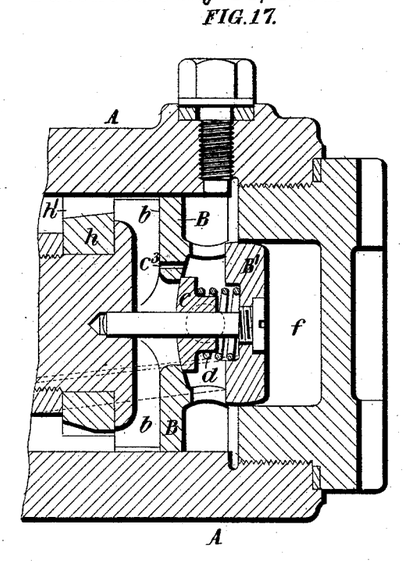
Figure 18:
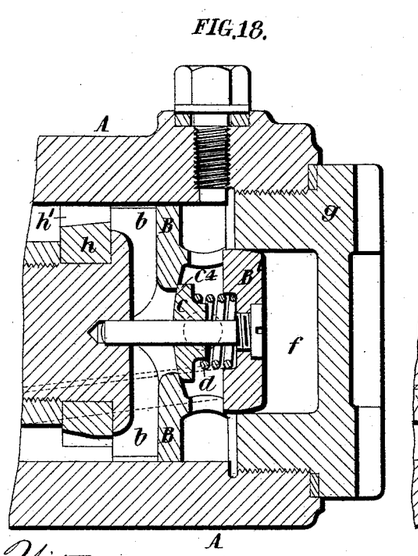
Figure 19:
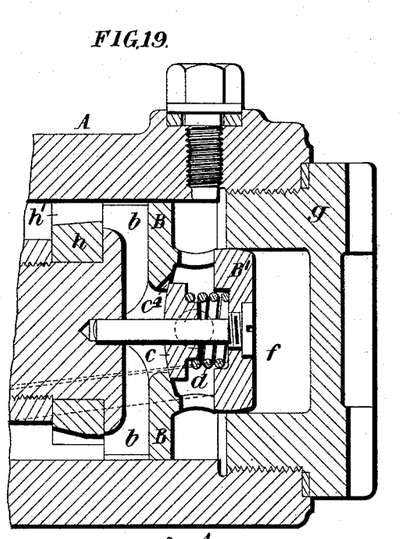

When the gun recoils, the pressure of the liquid, acting upon the valve $c$, compresses the spring $d$ and moves the said valve away from its seat, so that the liquid can flow from one to the other side of the piston B through the passage $b$. At the commencement of the running out or return movement of the gun the valve $c$ closes under the combined action of the spring $d$ and the pressure of the liquid, and the liquid can then only flow through the grooves or orifices $B^2$. Instead of these grooves I may provide one or more orifices in the valve $c$, as at $c^3$ in Fig. 16, or in its seat, as at $c^3$ in Fig. 17, or one or more grooves $c^4$ in the valve, as shown in Fig. 18, or in the valve-seat, as shown in Fig. 19. The transverse sectional area of the said grooves or orifices must be such that the running out can take place only at a comparatively low speed. The running out or return movement of the gun and top carriage is arrested without injurious shock or concussion by the buffer B', as above described with reference to Figs. 1 and 2.

In Fig. 7 I have shown a brake in which the ends of the cylinder A are connected by an external pipe or passage $b$, which is closed by a valve $c$, acted on by a spring $d$. This spring may consist of a set or series of Belleville disks. In this arrangement I bore one or more small holes, as at $c'$, in the said valve, or I form grooves $c^4$ in the bearing-surface of the said valve or of the valve-seat—as shown, for example, in Fig. 18 or in Fig. 19—to form return passages for the liquid, these holes or grooves being made of such sectional area that the gun and top carriage can only run out at a moderate speed. The piston B is, moreover, provided with a hydraulic buffer, as hereinbefore described.

Figure 8:
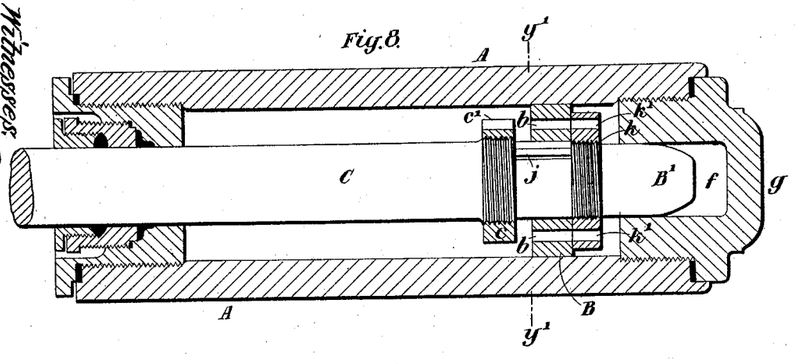
Fig. 8 is a longitudinal central section, and Fig. 9 a transverse section on the line *y' y'*, Fig. 8, showing another modification of my said invention.
Figure 9:
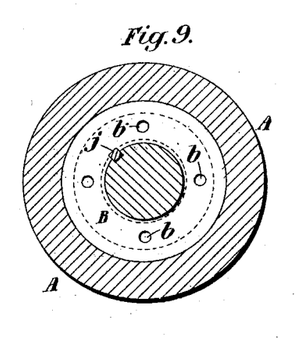
Figure 10:
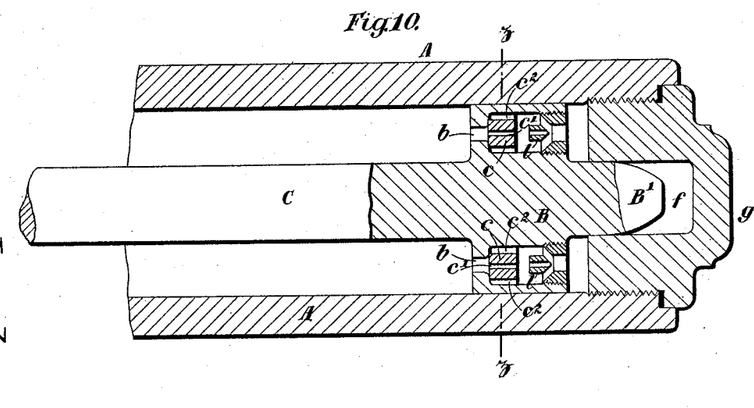
Fig. 10 is a longitudinal central section, and Fig. 11 a transverse section on the line z z, Fig. 10, showing another modification of my said invention.
Figure 11:
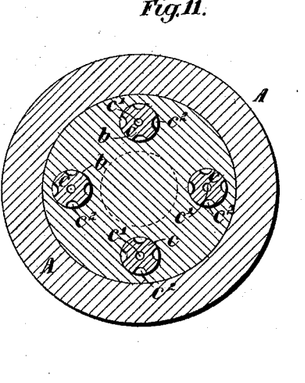

Figs. 8 and 9 illustrate an arrangement wherein the piston B is provided with holes or passages $b$ and in which the same principle is adopted for controlling the running out of the gun. The piston B moves on its rod C, and is guided during such movement and prevented from rotating by a key or feather $j$, fixed in the said rod C. On this rod C is fixed a disk $k$ and a valve $c$. In the disk $k$ are bored holes $k'$, corresponding with those in the piston B, and in the valve $c$ is formed a slot $c'$, corresponding with one of the holes in the said piston.

When the gun and top carriage recoil, the pressure of the liquid, acting upon the piston B, retains it against the disk $k$ and the liquid flows through the holes $b$ $k'$. When the gun and top carriage run out again, the pressure of the liquid forces the piston B against the valve $c$. The liquid can then flow only through one of the holes or passages $b$ in the piston. Consequently the forward or return movement of the gun is retarded, as required.

In another arrangement (shown in Figs. 10 and 11) I bore or otherwise form four or any other suitable number of passages $b$ in the piston B. The said passages are enlarged in the middle, as shown, and in each of the said passages is arranged a valve or piston $c$, having a central hole $c'$. These holes $c'$ are made of suitable size to permit the running out or return of the gun at the desired speed. The valves or piston $c$ have, moreover, longitudinal grooves $c^2$ formed in their peripheries. A stop $l$ is provided in each opening or passage $b$ for limiting the movement of the corresponding valve $c$. During the recoil the pressure of the liquid forces the valves $c$ away from their seats and against the stops $l$, and the liquid passes freely through the holes $c'$ and grooves $c^2$ in the said valves. When the gun and top carriage run out, the valves are forced against their seats by the pressure of the liquid, so that the grooves $c^2$ are closed and the liquid can only return through the small orifices $c'$. Therefore the movement of the gun is retarded, as required.

Figure 12:
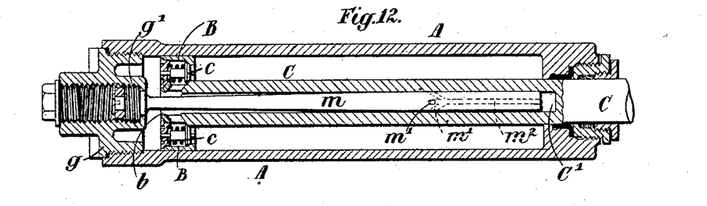
Fig. 12 is a vertical longitudinal central section illustrating a further modification thereof.
Figure 13:
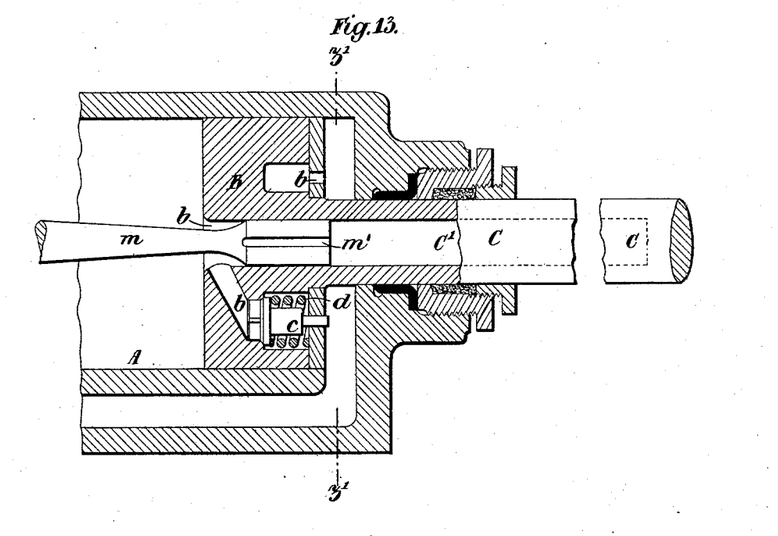
Fig. 13 is a vertical longitudinal central section, and Fig. 14 a transverse section on the line z′ z′, Fig. 13, illustrating a still further modification thereof.
Figure 14:
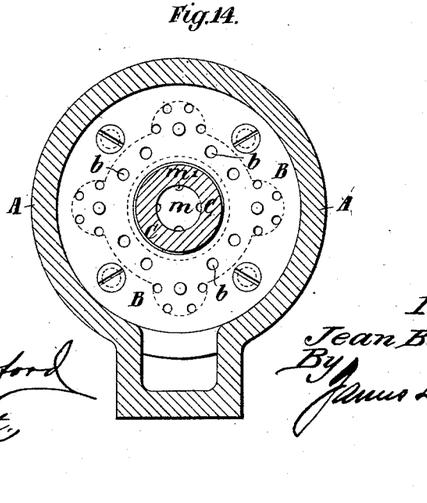

Fig. 12 and Figs. 13 and 14 show modifications wherein the rod C of piston B is hollow. In this hollow piston-rod is arranged a rod $m$ of unequal or varying diameter. This rod is firmly attached to the cylinder A, and is designed to afford the means for varying the transverse sectional area of the annular orifice or passage $b$ between the said rod $m$ and the piston B, and thus varying the resistance to the flow of liquid through the said orifice or passage for the purpose of regulating or controlling the recoil of the gun. The said rod $m$ also serves, as hereinafter explained, for controlling the running out or return of the gun to the firing position.

In the apparatus shown in Fig. 12 the cylinder is supposed to be fixed and the piston movable with the gun. In that shown in Figs. 13 and 14 the piston is supposed to be fixed and the cylinder movable with the gun. At the commencement of the recoil the liquid opens the spring-loaded valves $c$ in the piston B, and passes from the space on one side of the said piston through the orifice or passage $b$ to the other side thereof.

In the brake apparatus shown in Fig. 12 orifices $m'$ and a passage $m^2$ are formed through the taper rod $m$ to permit the flow of liquid to and from the space C' in the hollow rod C at the rear of the taper rod $m$. In the apparatus shown in Figs. 13 and 14 grooves or orifices $m'$ are formed in the said rod $m$ for this purpose. Small orifices or grooves are formed in the valves $c$ or in the seats of the said valves to permit the passage of liquid from one to the other side of the piston during the return of the gun to the firing position. The velocity of this return movement will in some measure depend upon or be governed by the size of these orifices. It will, moreover, in some instances depend upon or be governed by the size of the orifices or passages $m'$ $m^2$ in the taper rod $m$—that is to say, in the apparatus shown in Fig. 12. During the return of the gun to the firing position the liquid in the space C' is subjected to pressure, and the said liquid is forced through the passage $m^2$ and orifices $m'$ in the said rod $m$. This device will therefore assist in checking or controlling the return of the gun to the firing position. In the apparatus shown in Figs. 13 and 14 the rod $m$ enters the piston-rod C during the recoil of the gun, and therefore assists in checking or controlling such recoil by varying the transverse sectional area of the orifice or passage $b$. The rod $m$ is screwed into the cover or plug $g$ of the cylinder A, as at $g'$, Fig. 12, and can be adjusted longitudinally by turning it in one or the other direction, so that its position in the piston-rod C can be changed and the annular opening $b$ for the flow of liquid between it and the piston B diminished or enlarged, as required.

It will be seen that in the recoil of the gun the valves $c$ will be opened and the liquid will flow through the orifices or passages $b$; but the resistance to the flow of the said liquid will be varied during the recoil by the taper rod $m$ and the pressure in the cylinder thus equalized or nearly equalized throughout the recoil. Moreover, the return of the gun to the firing position will be retarded as required.

Figure 15:
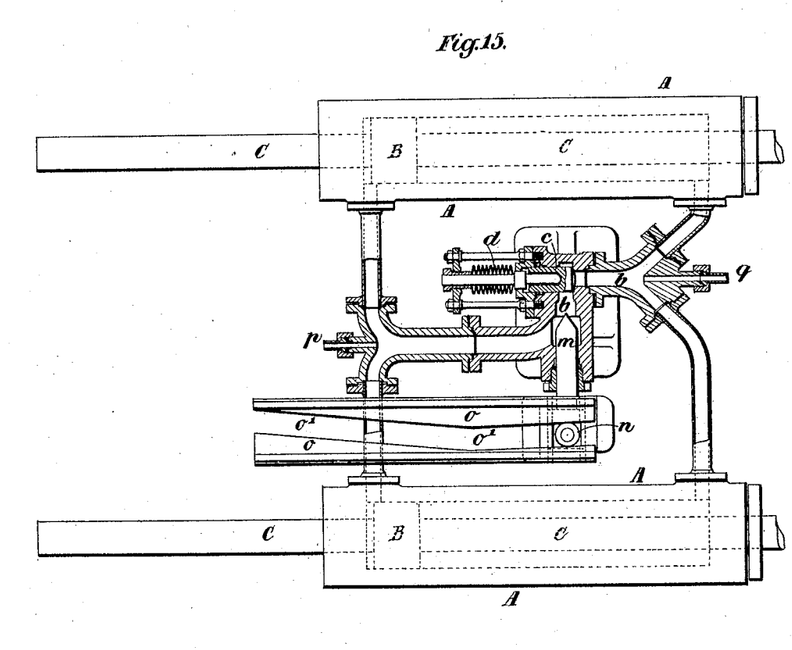
Fig. 15 is a plan, partly in horizontal section, showing two brakes provided with apparatus constructed according to a still further modification of my said invention.

Fig. 15 shows another arrangement of my improved hydraulic brake. In this figure the cylinders are supposed to be fixed and the pistons movable with the gun. The regulator in this apparatus consists of a rod $m$, provided at one end with a roller $n$, which is fitted to rotate upon a pin or stud fixed in the said rod, and is arranged to work in a groove $o'$ in a bar $o$, attached to the top carriage. The other end of the rod $m$ is made taper or conical and is adapted to close to a greater or less extent the passage $b$, connecting the rear with the front ends of the two brake-cylinders A in such a manner that the pressure generated in the cylinders in rear of the pistons by the recoil will be uniform or nearly uniform throughout the recoil. The shape of the said groove $o'$ is calculated to effect this result. The valve $c$ is loaded by the spring $d$ to a pressure slightly greater than that in the accumulator or pumps. When the gun is in its firing position, the valve $c$ is held to its seat by its spring $d$. The orifice or passage $b$ for communication between the ends of the brake-cylinders A is therefore closed. In the recoil, however, the said valve is moved away from its seat by the pressure of the liquid. The transverse sectional area of the said orifice or passage is, moreover, varied during the recoil by the changes in the position of the conical or taper rod $m$, and the said orifice is again completely closed by the valve $c$ when the gun arrives at the rear extremity of its recoil movement—that is to say, the said rod $m$ opens the orifice or passage $b$ more and more during the first portion of the recoil, then the inclination of the groove $o$ changing its direction the rod $m$ gradually closes the said orifice or passage, thereby creating an increasing resistance to the flow of the liquid from one to the other side of the pistons B, until at the termination of the recoil the said orifice or passage is completely closed by the valve $c$, under the action of its spring $d$. As the cylinders are full of water which cannot escape, the gun and top carriage are kept in the recoiled position. To provide for the running out or return of the gun to the firing position, two pipes $p$ $q$ are employed, which are connected to a distributing-valve, and each of which may serve alternately for the introduction and the discharge of the liquid. If after the recoil the pipe $q$ is placed in communication with the pumps or the accumulator and the pipe $p$ with the exhaust, the liquid, under pressure, will act on the rear of the pistons, and as the said pistons are attached to the top carriage the latter will move with them, and the running out will be effected by the pressure in the pump or accumulator acting upon the rear annular surfaces of the two pistons. If it is desired to run the gun in without firing it, the pipe $q$ is opened to the exhaust and the pipe $p$ is put in communication with the pump or accumulator. The pressure will then be exerted on the front surfaces of the pistons. The area of the said pistons should be such that the running out of the gun can be effected easily, whatever may be the angle or inclination of the gun-slide, taking also into account any extra angle or inclination due to the rolling of the vessel. The shape of the groove $o'$ may be varied to suit different requirements.

I sometimes provide for the running out or return of the gun to the firing position under the action of gravity. In this case I form holes or grooves in the valve $c$ or in the valve-seat for the return of the liquid. The pipes $p\ q$ may then be dispensed with. It is obvious that the improvements illustrated in Fig. 15 are also applicable to brakes with only one cylinder.

My improved hydraulic recoil-brake, constructed as hereinbefore described, is applicable to gun-mountings of various kinds with or without recuperator apparatus. It is evident, moreover, that in the above-described arrangements either the piston of the brake or the cylinder thereof may be fixed, as desired, the other part being attached to and movable with the gun.

What I claim is—

1. A hydraulic brake for ordnance, comprising a cylinder and piston and having an orifice or passage for the flow of liquid from one to the other side of said piston during the recoil of the gun, a self-acting valve for automatically controlling the flow of liquid through the said orifice or passage, and a small orifice or passage which cannot be closed by the said valve and which permits the slow return of the liquid during the running out of the gun to the firing position, for the purposes above specified.

2. A hydraulic brake for ordnance, comprising a cylinder and piston and having an orifice or passage for the flow of liquid from one to the other side of the said piston during the recoil of the gun, a self-acting valve for automatically controlling the flow of liquid through the said orifice or passage, a regulating device whereby the flow of the liquid through the said orifice or passage is varied during the recoil, and an orifice or passage which cannot be closed by the said valve and through which an approximately constant or uniform flow of liquid can take place during the running out of the gun to the firing position, for the purposes above specified.

3. A hydraulic brake for ordnance, comprising a cylinder and piston and having orifices or passages for the flow of liquid from one to the other side of the said piston, a self-acting valve whereby one of the said orifices or passages is opened during the recoil of the gun and is closed during the running out thereof to the firing position, and a regulating device for varying the area of this orifice or passage during the recoil, another of the said orifices or passages being always open for the flow of liquid, for the purposes above specified.

4. In a hydraulic brake for ordnance, having an orifice or passage for the flow of liquid from one to the other side of the piston, the combination of a self-acting valve whereby the said orifice or passage is opened during the recoil and is partially but not completely closed during the running out of the gun, and a regulator or controlling device acting to vary the area of the said orifice or passage available for the flow of the liquid, whereby the pressure in the brake-cylinder is maintained approximately constant or uniform during the recoil, while a small orifice is left open for the slow return of the liquid during the running out of the gun, substantially as and for the purposes above specified.

5. A hydraulic brake for ordnance, provided with an orifice or passage for the flow of liquid through the piston, and with a self-acting valve whereby the said orifice or passage is opened during the recoil and is closed during the running out of the gun, a groove or orifice being provided to permit the slow return of the liquid, substantially as and for the purposes above specified.

6. In a hydraulic brake for ordnance, the combination, with the brake-piston having an orifice or passage through the same, of a self-acting valve whereby the said orifice is opened during the recoil and is closed during the running out of the gun, and a regulator or controlling device whereby the pressure in the brake-cylinder is kept approximately constant or uniform during the recoil by varying the area of the said orifice or passage through the piston, a groove or orifice being provided to permit the slow return of the liquid, substantially as and for the purposes above specified.

7. In a hydraulic brake for ordnance, provided with an orifice or passage for the flow of liquid from one to the other side of the piston, a rod of unequal or varying diameter for regulating or controlling the flow of the liquid through the said orifice or passage, substantially as and for the purposes above specified.

8. In a hydraulic brake for ordnance, having an orifice or passage for the flow of liquid from one to the other side of the piston, a regulator or controlling device comprising a taper rod or bar extending through the said orifice or passage, for the purposes above specified.

9. In a hydraulic brake for ordnance, the combination, with the brake-piston having an orifice or passage through the same, of a regulator or controlling device comprising a taper rod or bar extending through the said orifice or passage, substantially as and for the purposes set forth.

10. In a hydraulic brake for ordnance, the combination, with the cylinder and piston, of a taper rod attached to one of these parts and working in a chamber or cavity in the other part, for the purpose above specified.

11. In a hydraulic brake for ordnance, the combination, with the brake-cylinder, of a piston having an orifice or passage for the flow of the liquid from one to the other side of the said piston, a rod of unequal or varying diameter for regulating and controlling the flow of the liquid through the said orifice or passage, and a loaded valve for partially closing the said orifice or passage, substantially as and for the purposes set forth.

12. In a hydraulic brake for ordnance, the combination of a cylinder provided with a rod of unequal or varying diameter, a piston having an orifice or passage through the same and formed with a hollow rod to work on the said taper rod, and a loaded valve in the said piston for partially closing the said orifice or passage, substantially as and for the purposes set forth.

In testimony whereof I have hereunto signed my name in the presence of two subscribing witnesses.

JEAN BAPTISTE GUSTAVE ADOLPHE CANET.

Witnesses:
J. L. RATHBONE,
R. J. PRESTON.